United States Patent Office 3,533,849
Patented Oct. 13, 1970

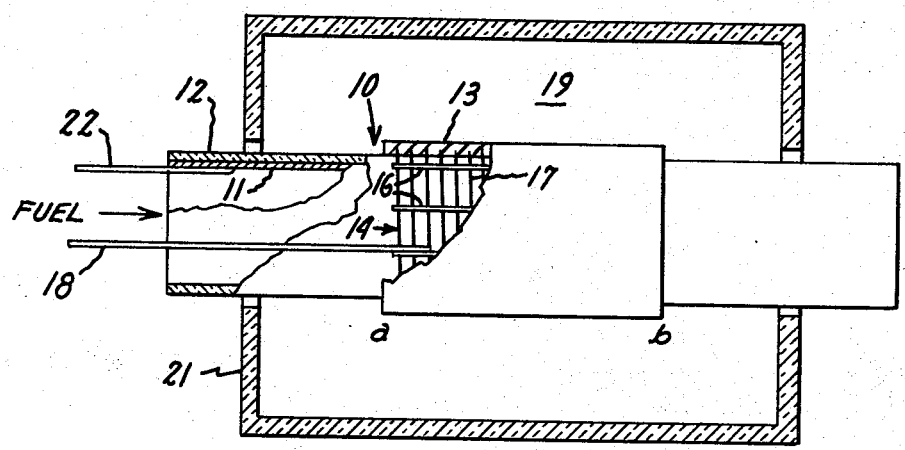
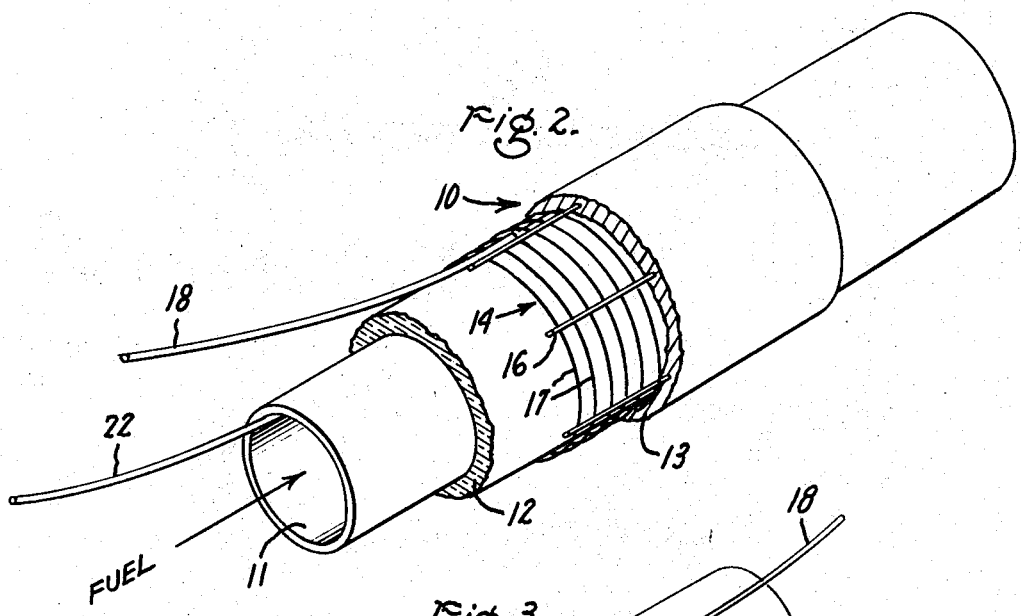
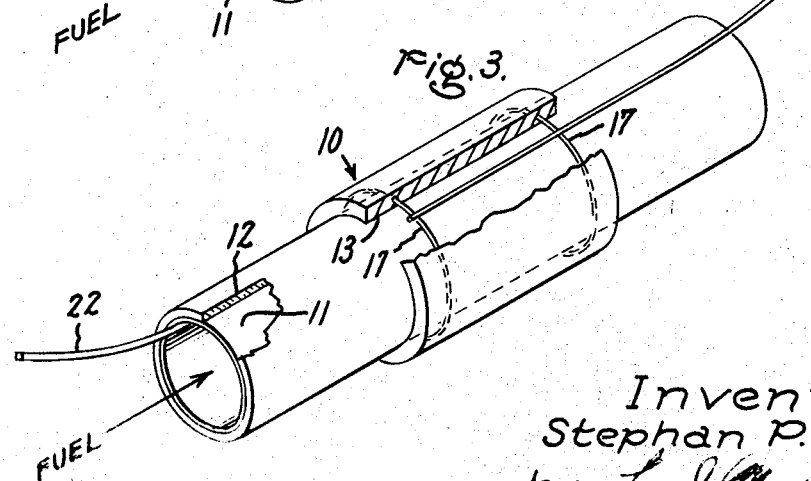
Inventor:
Stephan P. Mitoff,
by
His Attorney.

3,533,849
HIGH TEMPERATURE ELECTRICAL CONDUCTOR COMPRISING PRASEODYMIUM COBALTATE
Stephan P. Mitoff, Elnora, N.Y., assignor to General Electric Company, a corporation of New York
Filed June 12, 1967, Ser. No. 645,288
Int. Cl. H01m 27/16
U.S. Cl. 136—86            9 Claims

ABSTRACT OF THE DISCLOSURE

Praseodymium cobaltate ($PrCoO_3$) is disclosed as the major constituent of a high temperature electrically conducting deposit apparently displaying metallic electrical conductivity at temperatures over 700° C. A process for the preparation of this material is disclosed and, as well, the long-term compatibility of this compound with stabilized zirconia is established by the utilization of $PrCoO_3$ as a cathode layer in a high temperature fuel cell with the cathode layer in intimate contact with the solid stabilized zirconia electrolyte.

BACKGROUND OF THE INVENTION

This invention has particular applicability in the manufacture of components for fuel cells operating at high temperatures (over 1000° C.) as, for example, are shown in U.S. Letters Patent 3,138,487 and 3,138,490 assigned to the assignee of the instant application. Such fuel cells employ in combination a solid oxide-ion electrolyte, solid electrodes, fuel and oxygen supplies for the respective electrodes and electrical leads leading to the respective electrodes.

Such fuel cells, since they generate low voltage direct current power on a continuous basis, have many applications, as for example, in the manufacture of aluminum, the electro-refining of copper and for the operation of direct current motors. Also, fuel cell construction may be used as oxygen sensors, and, when operated in reverse, may be used as oxygen pumps.

Solid stabilized zirconia, which is the preferred oxide-ion material for the practice of this invention, is a compound with a cubic crystal structure consisting of zirconia to which is added calcium oxide, yttrium oxide, or a mixture of rare earth oxides. For example, the preferred solid zirconia material is one stabilized with about 15 molecular percent calcium oxide. Other stabilized zirconias, which may also be employed in the solid stabilized zirconia electrolyte are disclosed in "Oxide Ceramics" by Ryshkewitch, Academic Press, 1960, particularly on pages 354, 364 and 376 thereof.

One of the most serious problems faced in the high temperature fuel cell art is that of electrode construction. The material of which the electrodes are constructed must remain substantially inert to the solid oxide-ion electrolyte material, to the stabilizing components present therein and to the materials brought in contact therewith during operation of the fuel cell. The very high operating temperatures employed, of course, not only aggravate the problem of reactivity to a large degree, but also considerably complicate the electrical behavior of materials to be used as electrodes, since the electrical (or electronic) behavior of substantially all materials changes to a considerable degree between room temperature and temperatures of the magnitude prevailing during operation of these fuel cells. Further, another very substantial obstacle in the use of most base metals and alloys is that they are exposed to oxidizing atmospheres (such as air) at temperatures ranging between 600° C. and 1450° C. and oxidation of these materials drastically limits the life thereof.

A more concrete indication of the empirical nature of this art may be obtained by an examination of Table I wherein the test results obtained with a large number of materials proposed as cathode materials are set forth.

TABLE I

| Cathode material | Operating temperature, ° C. | Power output milliwatts/cm.² | Remarks |
|---|---|---|---|
| Ag plus $TiH_2$ | 1,000 | 150 | Evaporation of silver, poor performance. |
| Ag (liquid) | 1,000 | 50 | Do. |
| Ag plus $ZrO_2$* | 1,200 | 530 | Evaporation of silver. |
|  | 1,000 | 160 | Evaporation of silver, poor performance. |
| MnO | 1,250 | 75 | Poor performance. |
| $Mn_3O_4$ | 1,000 | ~5 | Very poor performance. |
| NiO-$ZrO_2$* cermet | 1,000 | ~5 | Do. |
| Lithiated NiO | 1,200 | 150 | Poor performance. |
| MCO (mixed conducting oxide, $UO_2$ plus $ZrO_2$ plus $Fe_2O_3$ plus $Y_2O_3$). | 1,350 | 700 | 50% degradation in a few weeks. |
|  | 1,200 | 100 | Poor performance. |
| 50% MCO plus 50% $La_{.6}Sr_{.4}FeO_3$ | 1,350 | 640 | Very rapid degradation. |
| MCO plus $U_3O_8$ (1:1 mix) | 1,350 | 915 | Rapid degradation, evaporation of $U_3O_8$. |
|  | 1,240 | 610 |  |
|  | 1,150 | 400 |  |
| MCO plus Pt | 1,350 | 660 | Short life. |
| $La_{.6}Sr_{.5}FeO_3$ plus $ZrO_2$* | 1,100 | 95 | Poor performance, sintered excessively, polarization. |
| $La_{.6}Sr_{.4}FeO_3$ plus $ZrO_2$* plus Pd | 1,250 | 125 | Poor performance, very short life. |
| Pt | 1,000 | 225 | Poor performance, excessive cost. |
| $Co_2O_3$ plus NiO | 1,100 | 70 | Poor performance. |
| Lithiated NiO plus $Co_2O_3$ | 1,100 | 50 | Do. |
| $Mn_3O_4$ plus $Co_2O_3$ | 1,100 | 75 | Do. |
| $Co_2O_3$ | 1,100 | 100 | Do. |
| $LaCoO_3$ plus $Co_2O_3$ | 1,100 | 320 | Short life. |
| $.3LaCoO_3$ plus $.7Co_2O_3$ | 1,100 | 75 | Poor performance, short life. |
| $LaCoO_3$ | 1,350 | 1,050 | Rapid degradation. |
|  | 1,200 | 680 | Do. |
| $Co_{.8}Sr_{.2}LaO_3$ | 1,350 | 700 | Do. |
|  | 1,200 | 380 | Do. |
| $Fe_2O_3$ | 1,350 | 620 | Short life. |
|  | 1,200 | 256 | Poor performance. |
|  | 1,300 | 200 | Do. |
| $Fe_2O_3$ plus $Co_2O_3$ | 1,200 | 100 | Do. |
|  | 1,100 | 100 | Do. |

Footnote at end of table.

Table I—Continued

| Cathode material | Operating temperature, °C. | Power output milliwatts/cm.$^2$ | Remarks |
|---|---|---|---|
| YCoO$_3$ | 1,350 | 40 | Do. |
| PrCoO$_3$ | 1,100 | 630 | 20-year half life. |
|  | 1,100 | 530 | Performance after 9 mos. operation. |

*Stabilized zirconia.

Power outputs of at least about 500 milliwatts/cm.$^2$ at temperatures low enough (less than 1200° C.) to enable the cathode current collector and power lead to survive are considered suitable for fuel cell usage, while somewhat lower performance is permissible for other uses.

The difficulties encountered with the use of cobalt lanthanate (CoLaO$_3$) as a cathode material for high temperature fuel cells are exemplary.

Thus, it was reported in the literature (Goodenough and Raccah), J.A.P. 36, 1031 (1965) that cobalt lanthanate functions as a metallic electrical conductor at temperatures above 1210° K. in an air atmosphere. Considering this a possible candidate for a material for the construction of the cathode of a high temperature fuel cell tests were conducted to determine the suitability of this compound for such usage.

The compound was prepared by mixing cobalt carbonate (CoCO$_3$) and lanthanum oxide (La$_2$O$_3$) in proportions to obtain ions of cobalt and lanthanum in a 1:1 ratio and then heating the mixture to about 1000° C. for about 1 hour. Some of the powder so prepared was pressed and sintered (1450° C.) to form a bar. Conductivity measurements thereon seemed to confirm the fact that cobalt lanthanate does function as a metallic electrical conductor at elevated temperatures, even at temperatures as low as about 600° C., at which temperature the conductivity was determined to be a little less than 1000 ohm$^{-1}$ cm.$^{-1}$.

Next, some of the cobalt lanthanate powder was mixed with water and carbo-wax to form a slurry. This slurry was then painted on the outisde of a zirconia tube, which was heated to about 1450° C. to sinter the coating. The conductivity of the porous sintered coating produced was measured and found to be 0.45 ohm per square for a 3 mil thick coating at 1000° C.

Still later a fuel cell was constructed using stabilized zirconia tubing (about one cm. inside diameter with a 20 ml wall thickness) with a nickel anode disposed over the inner surface thereof. Some of the cobalt lanthanate slurry was painted over the outside surface of the tube over which a platinum wire had previously been wound to function as a current collector. The tube was then heated in a furnace and at 1000° C. hydrogen was introduced to the inside of the tubing with air being passed over the outside surface thereof. The maximum power density generated at an EMF of 0.5 volt was as follows:

| °C. | Watts/cm.$^2$ |
|---|---|
| 1000 | 0.13 |
| 1100 | 0.35 |
| 1200 | 0.68 |
| 1290 | 0.95 |

Up to this point it seemed as though this compound with its rare earth component would be an ideal cathode material. However, at least 10 such cells were subjected to life tests and as the life tests proceeded, it was found that the initial high power density gradually diminished and in a relatively short period the fuel cell stopped functioning. X-ray examination of the material at the interface between the cobalt lanthanate and the zirconia established that at the interface between the cobalt lanthanate and the stabilized zicronia a chemical reaction had occurred and a new and different compound had been created. This compound, which acts as an electrical insulator gradually severed the electrical contact between the cobalt lanthanate layer and the stabilized zirconia until the electrical separation was substantially complete.

These conclusions were verified by preparing a mixture of calcium-stabilized ZrO$_2$ and CoLaO$_3$ and then pressing and sintering the mixture in the form of a pill. This pill was then heated in air to 1475° C., cooled and then reheated to measure both the ionic and electronic conductivity thereof 1000° C., 1100° C. and 1200° C. The ionic conductivity exhibited at these respective temperatures was .0017 ohm$^{-1}$ cm.$^{-1}$, .004 ohm$^{-1}$ cm.$^{-1}$ and .009 ohm$^{-1}$ cm.$^{-1}$. These values established that the internal resistance of the fuel cells with CoLaO$_3$ cathodes, which had been subjected to life tests had been grossly increased due to some chemical interaction, most likely a reaction between the CoLaO$_3$ and ZrO$_2$.

The same results occurred between the cobalt lanthanate and the ZrO$_2$ in the case yttria-stabilized zirconia. The exact composition of the newly formed insulating compound was not determined, but the exhibition of this deleterious lack of inertness definitely eliminated this rare earth compound from consideration.

A comparable compound employing the rare earth cerium (CoCeO$_3$) was also prepared and tested. This compound was quickly eliminated as a possible cathode material, because of the poor conductivity exhibited thereby.

Cobalt aluminate and yttrium cobaltate, which are not rare earth compounds, but which appear to have crystal structure analogous to cobalt lanthanate and praseodymium cobaltate were also tested for electrical conductivity. This preliminary test definitely established the unsuitability of these compounds as cathode materials.

SUMMARY OF THE INVENTION

In spite of the aforementioned deleterious self-defeating chemical reaction and/or the failure to exhibit the requisite conductivity, which occurred when certain rare earth compounds and compounds analogous thereto in crystal structure were tested, still another rare earth compound, praseodymium cobaltate (PrCoO$_3$) was prepared. No previous information had been available in the literature with respect to the electrical behavior of this material or with respect to its behavior in contact with stabilized zirconia. The work with similar compounds and compounds of analogous crystal structure referred to above only gave reason to expect failure. However, it was established that PrCoO$_3$ exhibits electrical conductivity similar to that of CoLaO$_3$ and it was decided to go ahead with tests of PrCoO$_3$ as a fuel cell cathode material. It was found that not only did the praseodymium compound exhibit all the beneficial aspects of the lanthanate compound but, surprisingly, although some reaction does occur between PrCoO$_3$ and the stabilized zirconia the decay in power generation is extremely slow, the kinetics of this reaction being different from the kinetics of the reaction between the lanthanate compound and stabilized zirconia. In fact, tests of over 6 months duration have established degeneration rates, which indicate that even at the end of 20 years the capabilities of a stabilized zirconia fuel cell employing PrCoO$_3$ as the cathode material should still function at at least 50 percent of the original capacity.

Another important feature of the praseodymium cobaltate compound is that the homogeneity range of this material is relatively broad making manufacture thereof not overly critical. This does not mean that $PrCoO_3$ is not a real compound, but only indicates that in the preparation thereof by the simultaneous plasma spraying of CoO and $Pr_2O_3$ powders, the resulting deposit functions very well as a high temperature electrical conductor in an oxidizing atmosphere whether it be a single phase (entirely $PrCoO_3$) or whether it be a mixture in which either a small excess of CoO or of $Pr_2O_3$ is interspersed in the $PrCoO_3$. Thus, the presence of one or the other second phase material in a quantity up to about 10 weight percent of the total deposit has produced a satisfactory cathode layer. Thus, although a stoichiometric relationship would be the nominal goal, attainment thereof is not critical. However, the approximate stoichiometric composition can be produced by mixing $CoCO_3$ and $Pr_2O_3$ powders in proportions to obtain ions of cobalt and praseodymium in a 1:1 ratio and then heating the mixture to about 1000° C. for about 1 hour.

Studies of $PrCoO_3$ have indicated that in the temperature range extending from room temperature to about 700° C. this compound functions as a semiconductor while at temperatures in excess of about 700° C. the electrical conduction mechanism thereof appears to be "metallic" in the sense that electrons exist in the lattice structure of the material in incompletely filled bands. Another way of expressing the electrical behavior of this compound is to say that it is electronically conducting.

The compound produced by either of the above methods can be reduced to a powder, pressed alone or with a small amount of a carbon-base binder and then sintered into any desired form or the compound may be simultaneously prepared by plasma spraying and deposited on a suitable substrate, such as stabilized zirconia as, for example, for use as an electrical conductor in highly oxidizing atmospheres at high temperatures.

In constructing a high temperature fuel cell cathode from the praseodymium cobaltate, however, it is a prerequisite for this and other non-ionic conducting materials that the cathode layer be porous. Thus, in preparing such a cathode, praseodymium cobaltate, powder is mixed with small amounts of water and carbo-wax to form a slurry. This slurry is then painted on the electrolyte and sintered at the fuel cell operating temperature and the requisite porous conducting layer results.

DESCRIPTION OF THE DRAWING

The exact nature of this invention as well as objects and advantages thereof will be readily apparent from consideration of the following specification relating to the annexed drawing in which:

FIG. 1 shows a fuel cell partially cut away to display the relationship between the solid oxide-ion electrolyte, the anode layer and the current-carrying lead attached to the anode;

FIG. 2 is a three-dimensional representation, partially cut away, of a typical construction used with prior known cathode materials showing the layered arrangement of the anode, solid oxide-ion electrolyte and cathode with a current collecting grid and conductor element for carrying the current out of the hot zone wherein the fuel cell operates and FIG. 3 is a view similar to FIG. 2 showing the fuel cell construction made possible using praseodymium cobaltate as the cathode material.

DESCRIPTION OF THE PREFERRED EMBODIMENT

In the particular construction shown herein fuel cell 10 consists of a series of superimposed concentric layers (anode 11, electrolyte 12 and cathode 13). These layers may be prepared by conventional processes, for example, tubes of stabilized zirconia are commercially available and may be densified by sintering to render them gas impermeable. Thereafter, nickel layer 11 may be deposited within electrolyte tube 12 by electrical or chemical deposition. Next, the cathode construction including an appropriate current collection system is provided. All oxide-ion conducting material, mixed oxide-ion and electronic conducting material, p-type semiconducting oxide material and electronically conducting oxide-type compounds known and used heretofore as cathode materials have required very substantial and intimate contact with the current collector structure, which may have any of a variety of configurations. Such a construction is shown in FIG. 2 prepared by slipping collector grid 14 (for example of nickel oxide-coated silver-palladium, consisting of 20 mil diameter wires 16 interconnected by 5 mil diameter hoops 17) connected to larger diameter lead 18 over the anode-electrolyte composite and then applying a coating of the cathode material, for example praseodymium cobaltate, substantially completely enveloping the wires 16 and hoops 17 as well as a length of the anode-electrolyte composite as from $a$ to $b$ (FIG. 1). The intimate electrical contact established between the grid 14 and the cathode material is carried to cathode lead 18 and thence out of the hot operating zone 19 of the cell within refractory housing 21 to some exterior connection. Lead 22 connected to nickel anode 11 provides for exterior connection to the anode. Fuel is admitted to the interior as shown and air is freely admitted to zone 19.

In contrast to the aforementioned cathode material, the conductivity of $PrCoO_3$ is so much greater that electron transfer from as great a distance as 1 cm. from the collector element is achieved effectively therewith, while the current collector windings in cathode constructions using the prior cathode materials had to be spaced a maximum distance of about 1 mm. apart, reflecting a ten-fold improvement. As a result, as is shown in FIG. 3, in a cathode that would have required a number of wires 16 and about 21 hoops 17 using prior cathode materials, only a pair of hoops 17 and a continuation of lead 18 to connect hoops 17 need be employed with $PrCoO_3$ as the cathode material to achieve fully effective electrical contact.

Lead wire 22 may be made of nickel oxide-coated silver-palladium as in the embodiment of FIG. 2, palladium or platinum or may be made of $PrCoO_3$ itself by reducing the compound to a powder, compacting it to the desired shape and size and then sintering the shape produced. Nickel oxide-coated silver-palladium electrical conductors are disclosed in U.S. patent application S.N. 645,287—Hirsch et al., filed simultaneously herewith and assigned to the assignee of the instant application.

Elimination of a large portion of the current collector (grid 14) from the cathode 13 is reflected in substantial savings in material cost as well as in a reduction in the cost of labor in preparing such units. Also, the use of $PrCoO_3$ results in very effective power production regardless of whether the construction of FIG. 2 or of FIG. 3 is employed. This has been established by tests, the results of tests in a fuel cell employing stabilized zirconia electrolyte containing a small amount of $Fe_3O_4$ and a $PrCoO_3$ cathode being as follows in the case cell A continuously heated at 1000° C. and cell B continuously heated at 1100° C.:

| Time: | Power output (milliwatts/cm.²) A | B |
|---|---|---|
| Initial hearing | 250 | 610 |
| 62 days | 240 | |
| 110 days | | 585 |
| 263 | | 525 |

Thus, a novel electrically conducting material has been disclosed having utility as a conductor at temperatures in excess of about 700° C. being particularly interesting for its ability to perform in oxidizing atmospheres at these temperatures. The relative inertness of praseodymium cobaltate with respect to oxide-ion electrolytes, for example stabilized zirconia has been established, making $PrCoO_3$ of great importance in future high temperature fuel cell construction.

What I claim as new and desire to secure by Letters Patent of the United States is:

1. In an electrical device embodying in combination an electric current-carrying element, means for conducting electrons to and means for conducting electrons from said electric current-carrying element to which said means are electrically connected, and in which the transfer of electrons through said current-carrying element is effected at temperatures in excess of about 700° C., the improvement in said combination of having said electric current-carrying element formed of a sintered material comprising the compond praseodymium cobaltate.

2. The improvement recited in claim 1 wherein the sintered material is at least about 90 weight percent praseodymium cobaltate.

3. The improvement recited in claim 2 wherein the sintered material is porous.

4. In an electrical device for operation at temperatures in excess of about 1000° C., said device comprising in combination a solid anode layer and a solid cathode layer separated by a layer of solid oxide-ion electrolyte, the improvement in said combination comprising the cathode layer having as the major constituent thereof the compound praseodymium cobaltate.

5. The improvement recited in claim 4 wherein the cathode layer is porous.

6. The improvement recited in claim 4, the cathode layer comprising at least about 90 weight percent praseodymium cobaltate.

7. In a fuel cell for operation at temperatures in excess of 1000° C., said fuel cell comprising combination a solid anode layer and a solid cathode layer separated by a layer of solid oxide-ion electrolyte, the improvement in said combination comprising the cathode layer having as the major constituent thereof the compound praseodymium cobaltate.

8. The improvement recited in claim 7 wherein the cathode layer is porous.

9. The improvement recited in claim 7, the cathode layer comprising at least about 90 weight percent praseodymium cobaltate.

References Cited

UNITED STATES PATENTS

| 3,300,344 | 1/1967 | Bray et al. | 136—86 |
| 3,377,203 | 4/1968 | Mobius et al. | 136—86 |

FOREIGN PATENTS

| 22,030 | 10/1961 | Germany. |

OTHER REFERENCES

Ruggiero et al.: "Orthocobaltities of the Rare Earth Elements."

Chemical Abstracts, 49, 10779e, 1954.

WINSTON A. DOUGLAS, Primary Examiner

M. J. ANDREWS, Assistant Examiner

U.S. Cl. X.R.

136—120